United States Patent
Hunzinger

(10) Patent No.: US 6,724,745 B1
(45) Date of Patent: Apr. 20, 2004

(54) PROCESSING REDUCTION IN CDMA TELEPHONES

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 860 days.

(21) Appl. No.: 09/591,182

(22) Filed: Jun. 8, 2000

(51) Int. Cl.[7] ................................................. H04J 13/00
(52) U.S. Cl. ........................ 370/342; 370/335; 375/130
(58) Field of Search ................................. 370/320, 335, 370/342, 441, 479; 375/130; 455/453

(56) References Cited

U.S. PATENT DOCUMENTS

| | | | | |
|---|---|---|---|---|
| 5,781,543 A | * | 7/1998 | Ault et al. | 370/342 |
| 5,790,589 A | * | 8/1998 | Hutchison, IV et al. | 375/200 |
| 6,069,880 A | * | 5/2000 | Hughes et al. | 370/311 |
| 6,320,849 B1 | * | 11/2001 | Hughes et al. | 370/310 |
| 6,351,486 B1 | * | 2/2002 | Edison | 375/150 |
| 6,564,062 B1 | * | 5/2003 | Hunzinger | 455/453 |

* cited by examiner

Primary Examiner—Kenneth Vanderpuye
(74) Attorney, Agent, or Firm—Harness, Dickey & Pierce, PLC

(57) ABSTRACT

A system of adjusting times between predetermined searches. The searching in a CDMA telephone is adjusted according to the load on the CDMA telephone processor. When the load is low, the searches can be carried out more frequently. When the load is increased, the searches are carried out less frequently. The system determines the load on the processor in either increments or decrements the time between searches as appropriate. In this way, the load on the CDMA telephone processor can be reduced.

9 Claims, 2 Drawing Sheets

PROCESSING REDUCTION IN CDMA TELEPHONES

BACKGROUND

CDMA telephones periodically carry out searches, in which each of a plurality of base units or base stations that are within range are covered. Processing is carried out based on the results of the searches. Among other things, that processing allows the handset to determine which of the plurality of stations should be communicated with. However, as more functions are placed in the processor of the CDMA telephone, it becomes more difficult for the processor to carry out all of these functions at any given time.

SUMMARY

The present application discloses a technique of determining processor load, increasing the number of searches when the processor load is low, and decreasing the number of searches when the processor load is high.

BRIEF DESCRIPTION OF THE DRAWINGS

These and other aspects will be described in detail with reference to the accompanying drawings wherein.

DETAILED DESCRIPTION

Figure 1:
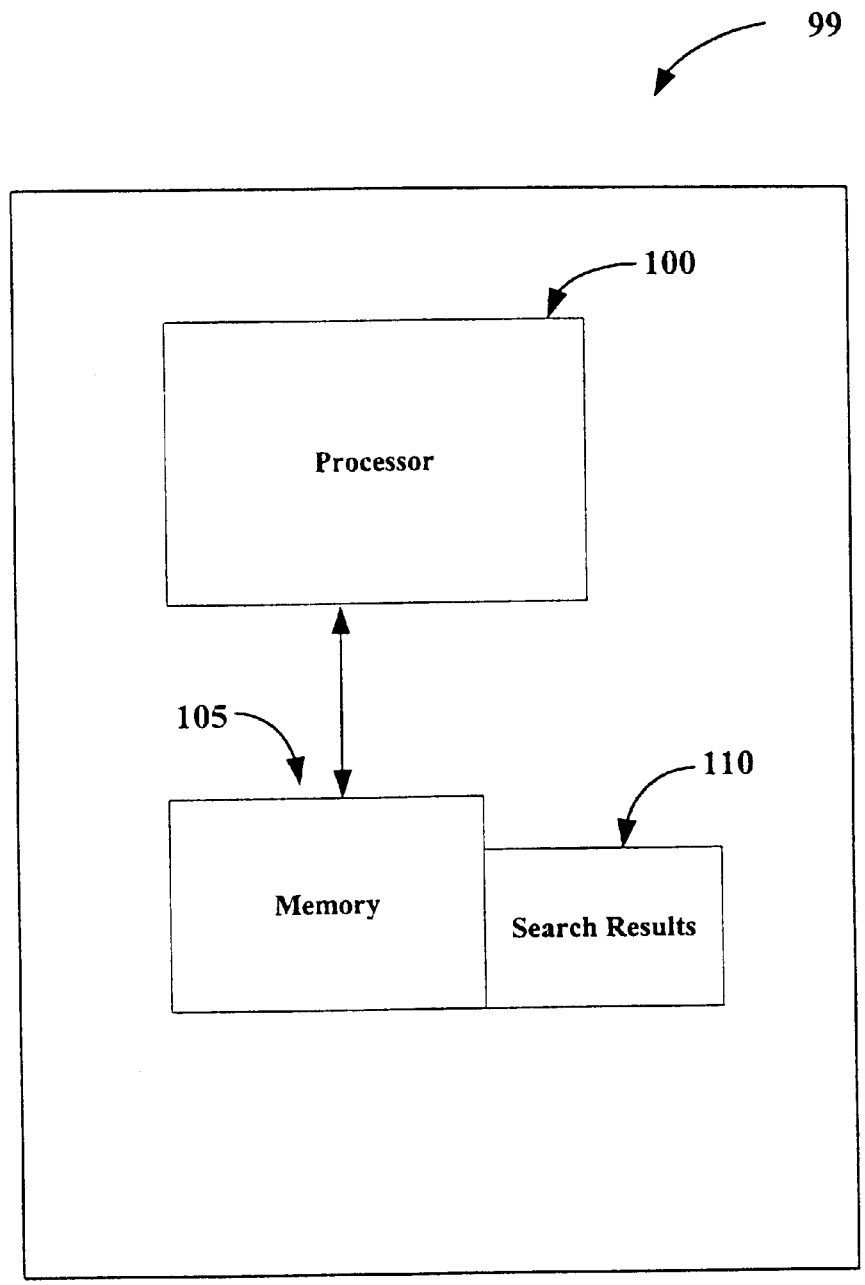
FIG. 1 shows a block diagram of a processor system in a CDMA telephone.

FIG. 1 shows a block diagram of CDMA telephone 99 and the processing that occurs in that telephone. The processor 100 is driven by a program stored in a memory 105. Parameters for the telephone may also be stored in another part of memory shown here as 110. The memory 110 stores various conditions including information obtained from searches to base stations.

Figure 2:
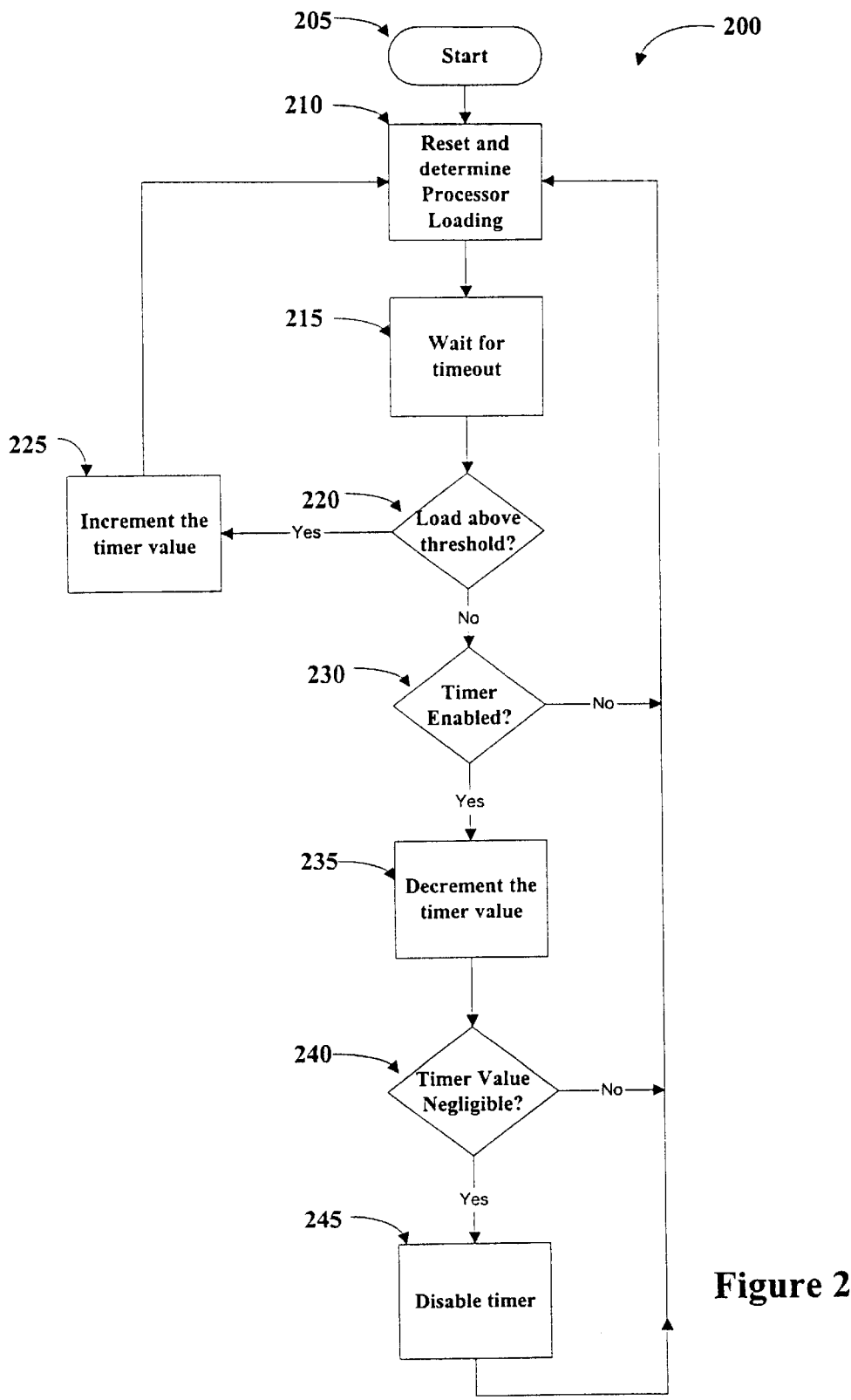
FIG. 2 shows a diagramatic flowchart of the CDMA operation.

The processor 100 executes a program 200 shown in FIG. 2. The program begins at START block 205. Proceeding to block 210, the processor resets and determines the processor loading is determined using a well known program. The processor loading can be determined, for example, as a percentage of maximum. A load of 100 would mean that the processor is operating at its maximum and basically has no free time between tasks. A load of zero would mean that the processor is totally idle and is waiting for the next program instruction. Since the processor operates on an instruction-by-instruction basis, the program in block 210 can determine statistically how often the processor is executing its instructions. This load may change on a time-by-time basis. Hence, block 210 can be carried out, for example, every 5 ms.

Proceeding to block 215, the program 200 waits for the timer to run and timeout. While the timer is running in block 215, new searches and search result processing are not permitted. However, inter-process messaging, control signals, and non-search related interrupts are handled.

After timeout, the program 200 proceeds to block 220. In block 220, a decision is made as to whether the processor is loaded above a predetermined limit, or threshold value. That limit may be for example 75% or 90%. If the processor load is above the threshold limit and therefore overloaded, the program proceeds along the YES branch to block 225.

In block 225, the search timer is incremented. This causes the time between searches to increase, thereby lightening the load on the processor. The time between searches may be increased by a predetermined amount, such as 10 milliseconds or 20 milliseconds. The timer may capped at a maximum, which may be 100 milliseconds. This maximum can be set as the maximum amount of time between searches, which can still enable adequate communication.

Returning to block 220, if the processor load is not above the threshold, the program proceeds along the NO branch to block 230. In block 230, the program checks to determine if the timer is enabled. If the timer is disabled, the program 200 proceeds along the NO branch to block 210 where the process resets and repeats. If the timer is enabled, the program 200 proceeds along the YES branch to block 235.

In block 235, the processor is determined not to be loaded over the predetermined limit and the timer is decremented. This causes the time between searches to be decreased by some value. This value may be less than the value the timer is incremented in block 225. For example, the decrement could be by 5 milliseconds or by 10 milliseconds.

Proceeding to block 240, the program 200 determines if the timer value is negligible. For example, if the timer value falls below a predetermined limit, the value may be considered negligible. If the timer value is not negligible, the program proceeds along the NO branch back to block 210 to repeat the program. If the timer value is negligible, the program 200 proceeds along the YES branch to block 245.

In block 245, the program 200 has determined the timer value is negligible and therefore disables the timer. After disabling the timer, the program resets by proceeding to block 210.

It should be noted that while this system decreases the searching amounts, it does not decrease any of the other CDMA functions. Only searching to base stations is decreased. Therefore, there may be no effect on the user's conversation. Searching is carried out more frequently when there is a low load on the processor and less frequently when there is a high load on the processor.

Although only a few embodiments have been disclosed in detail above, other modifications are possible. For example, while the above has described comparing with only a single limit, it may be possible to compare with a first (e.g. upper) limit and a second (e.g. lower) limit. For example, upper and lower limits on processor operations can be set. For example an upper limit of 90% can be set and a lower limit of 50% can be set. Anywhere in between the two specified operations, that is when the processor is operating between 50 and 90% loaded, no change in operation may be carried out. When the processor is loaded more than that upper limit (90%) the time between searches is increased. When the processor is loaded less than 50%, the time between searches is decreased.

Another operation can set degradations so that the increments can be changed at different levels. For example, the increment could be increased by 5 milliseconds when the processor is loaded at 90% and by 10 milliseconds when the processor is loaded at 95%.

All such modifications are intended to be encompassed within the following claims in which:

What is claimed is:

1. A method of operating a CDMA telephone, comprising:
   determining a time interval in which to carry out a search of CDMA base stations from the CDMA telephone;
   determining a load on a processor of the CDMA telephone; and
   adjusting said time interval based on said load on the processor.

2. A method as in claim 1 wherein said adjusting comprises increasing the time between searches when the processor is heavily loaded.

3. A method as in claim 1 wherein the adjusting comprises decreasing the time between searches when the processor is lightly loaded.

4. A method as in claim 2 wherein the adjusting comprises decreasing the time between searches when the processor is lightly loaded.

5. A method as in claim 4 further comprising carrying out said searches at times defined by said interval.

6. A cellular telephone apparatus, comprising:

a cellular transceiver, which can be operated to conduct a search to a remote base station; and a controller, which is actuated at predetermined intervals to initiate said search, said controller also determining a load on the controller, and adjusting said intervals based on the load on said controller.

7. A device as in claim 6 wherein said controller includes a processor.

8. A device as in claim 6 wherein said controller determines a load over a predetermined level, and increases a time between searches based on said load over said predetermined level.

9. A device as claim 6 wherein said controller determines a load below a predetermined level and decreases a time between searches based on said load.

* * * * *